United States Patent
Sakuyama

(10) Patent No.: US 6,236,776 B1
(45) Date of Patent: May 22, 2001

(54) SUBMARINE OPTICAL GAIN EQUALIZER, SUBMARINE OPTICAL TRANSMISSION LINE AND ITS INSTALLATION METHOD

(75) Inventor: Hiroshi Sakuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/063,041

(22) Filed: Apr. 21, 1998

(30) Foreign Application Priority Data

Apr. 25, 1997 (JP) .................................................. 9-109823

(51) Int. Cl.[7] .................................................. H04B 10/18
(52) U.S. Cl. ........................ 385/24; 385/100; 359/161
(58) Field of Search .......................... 385/100, 101, 385/24; 174/70 R, 70 S; 359/153, 161, 124

(56) References Cited

U.S. PATENT DOCUMENTS

| | | | |
|---|---|---|---|
| 4,767,173 | * 8/1988 | Priaroggia | 385/69 |
| 5,110,224 | * 5/1992 | Taylor et al. | 385/25 |
| 5,222,176 | * 6/1993 | Webber et al. | 385/99 |
| 5,446,812 | * 8/1995 | Hirst | 385/24 |
| 5,546,485 | * 8/1996 | Darcie | 385/28 |
| 5,815,299 | * 9/1998 | Bayart et al. | 359/171 |
| 5,915,052 | * 6/1999 | Ball | 385/24 |
| 5,933,552 | * 8/1999 | Fukushima et al. | 385/24 |
| 6,016,373 | * 1/2000 | Kidorf | 385/24 |
| 6,094,519 | * 7/2000 | Takeda | 385/138 |
| 6,144,474 | * 11/2000 | Nitta et al. | 359/179 |

FOREIGN PATENT DOCUMENTS

| | | |
|---|---|---|
| 62-90043 | 4/1987 | (JP) . |
| 4-104530 | 4/1992 | (JP) . |
| 7-263778 | 10/1995 | (JP) . |
| 10-261998 | * 9/1998 | (JP) . |

OTHER PUBLICATIONS

Japanese Office Action, datd Dec. 21, 1999, with English translation of Japanese Examiner's comments.

* cited by examiner

*Primary Examiner*—Rodney Bovernick
*Assistant Examiner*—Michael J. Stahl
(74) *Attorney, Agent, or Firm*—McGuireWoods LLP

(57) ABSTRACT

A submarine optical gain equalizer installed on a submarine optical transmission cable 5 comprises a pressure housing 1, in which an optical gain equalizer and n through-fibers are installed. Input and output ports of the optical gain equalizer and the through-fibers are formed in the outside of the pressure housing. The submarine optical gain equalizer equalizes levels of signal light having wavelengths different from each other caused by optical fiber amplifiers. In general, one submarine optical gain equalizer is installed for every 40 optical fiber amplifiers on a submarine optical cable.

6 Claims, 4 Drawing Sheets

OPTICAL FIBER 10

OPTICAL FIBER 11

OPTICAL FIBER 10

OPTICAL FIBER 11

SUBMARINE OPTICAL GAIN EQUALIZER, SUBMARINE OPTICAL TRANSMISSION LINE AND ITS INSTALLATION METHOD

BACKGROUND OF THE INVENTION

1. Field of the Invention

The present invention relates to a Wavelength Division Multiplexing (WDM) submarine optical repeater system and particularly to a submarine optical gain equalizer installed on a submarine optical transmission line, and the submarine optical transmission line and its installation method.

2. Related Background Art

In the WDM optical transmission system, to transmit multi-wavelength optical signals in a long distance, it is necessary to install light amplifiers at predetermined intervals on an optical transmission line so as to amplify signal light. The light amplifiers, however, have gain characteristics slightly different among wavelengths, which causes level differences between optical signals having longer wavelengths and shorter wavelengths. These level differences are accumulated in each light amplifier. Accordingly, some lines are disabled from being used for communications in long-distance optical transmission lines. Therefore, in a short optical transmission system over a transmission distance of several hundreds of kilometers or so, light source power of signal light having different wavelengths has been previously adjusted based on the characteristics of the light amplifiers, for example.

In a submarine optical communication system, however, with multi-wavelength light having an optical transmission line exceeding 10,000 km, for example, a method of adjusting the light source power of the signal light does not function appropriately in some cases. In the submarine optical communication system including such a long-distance optical transmission line, there has been no proposal of any specific configuration of gain equalization for adjusting respective wavelength levels. It is also possible theoretically to achieve an equipment for detecting respective wavelength levels automatically and for adjusting the levels. It is presumed, however, that this kind of the equipment is extremely complicated and requires high cost.

SUMMARY OF THE INVENTION

It is an object of the present invention to provide a submarine optical gain equalizer for compensating efficiently for gain differences between wavelengths of multi-wavelength optical signals transmitted on an actual submarine optical transmission line at low cost, the submarine optical transmission line and its installation method.

The submarine optical gain equalizer of the present invention comprises a pressure housing and an optical gain equalizer installed in the pressure housing having input and output ports formed in the outside of the pressure housing. In the pressure housing, one optical gain equalizer can be installed. In addition, one or more through-fibers can be installed in the pressure housing. The optical gain equalizer attenuates levels of optical signals having specific wavelengths by predetermined amounts. On the submarine optical transmission line of the present invention, one or more submarine optical gain equalizers in the above are installed. An installation method of the submarine optical transmission line comprises detecting respective wavelength levels of multi-wavelength optical signals in respective optical fibers composing the submarine optical transmission line and connecting submarine optical gain equalizers for compensating for the predetermined level differences between the detected wavelengths in the detected positions of the optical fibers. This invention provides an efficient and low-cost compensation for the level differences in multi-wavelength light transmitted through the long-distance submarine optical transmission line.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

Figure 1:
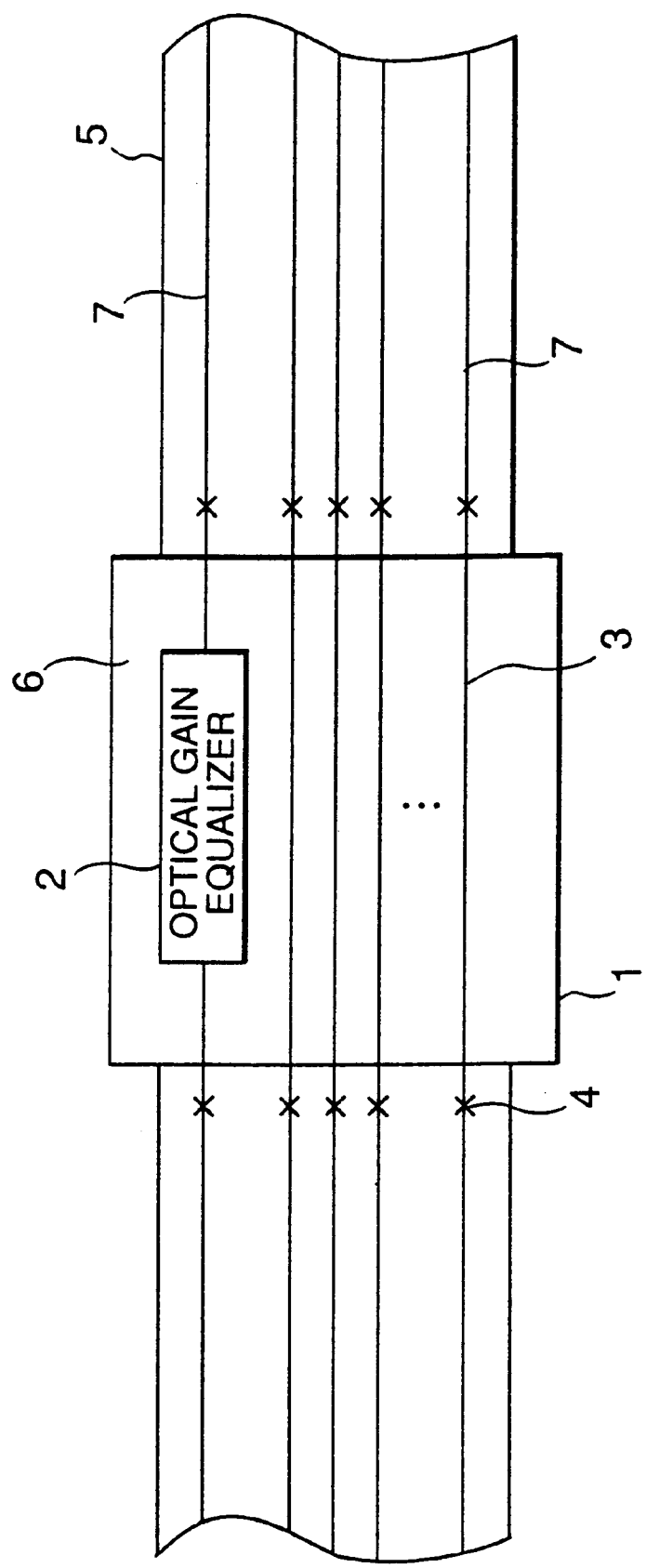
FIG. 1 is a diagram illustrating a configuration of a submarine gain equalizer according to the present invention.

Referring to FIG. 1, there is shown an embodiment of a configuration in which a submarine optical gain equalizer of the present invention is installed on a submarine cable 5. A pressure housing 1 contains an optical gain equalizer 2 and n through-fibers 3. Input and output ports of the optical gain equalizer 2 and the through-fibers 3 are formed in the outside of the pressure housing 1. n+1 optical fibers 7 in the submarine cable 5 are connected to the input and output ports of the optical gain equalizer 2 and the through-fibers 3 at splice points 4. In the same manner as for a normal submarine optical repeater, the pressure housing is a cylinder made of beryllium copper as a material having a thickness of 1 to 2 cm and a diameter of 20 to 30 cm on a cross-section.

Figures 2A, 2B:
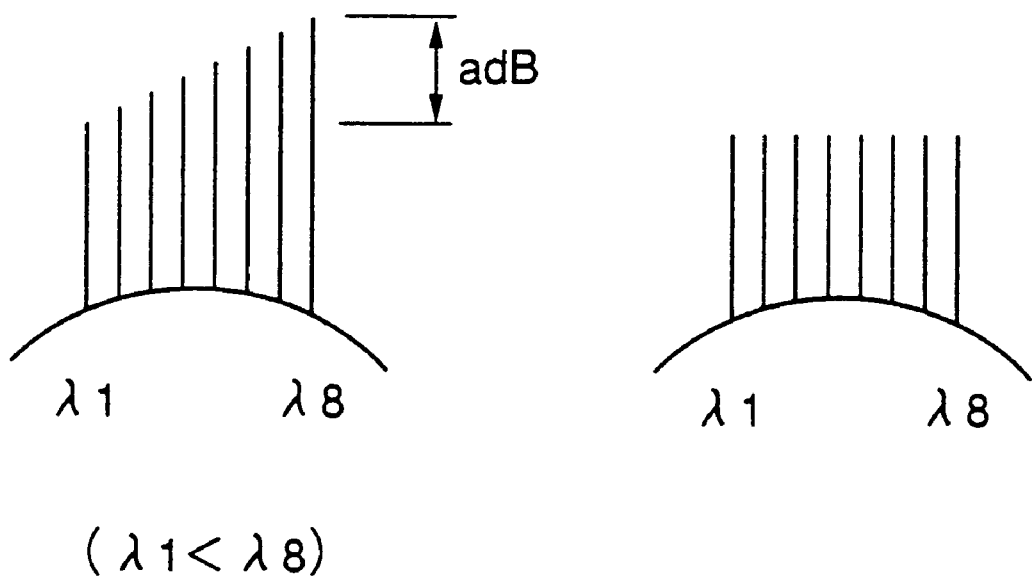
FIGS. 2A and 2B are diagrams illustrating levels of a multi-wavelength optical signal before and after compensation.

FIG. 2A illustrates a state of a level difference, adB between the shortest wavelength and the longest one in multi-wavelength optical signals having eight wavelengths in the optical fiber connected to the optical gain equalizer 2. Under this condition, after the multi-wavelength optical signals are transmitted through the optical gain equalizer 2, the optical signals having wavelengths other than the shortest one attenuate so as to be equalized to the level of the shortest one as shown in FIG. 2B. Other optical fibers are connected to the through-fibers 3 even if there are significant level differences between wavelengths of multi-wavelength optical signals transmitted through the optical fibers. The optical gain equalizer 2 is manufactured with its attenuation characteristics being calculated based on conditions such as wavelengths of signal light, the number of installed light amplifiers and their characteristics, lengths of optical fibers, and a temperature of the sea bottom where the submarine cable is to be installed. The optical gain equalizer 2 is a known device, specifically of a fiber grating type or of an etalon type configured so as to obtain attenuation amounts depending upon wavelengths.

Figure 3:
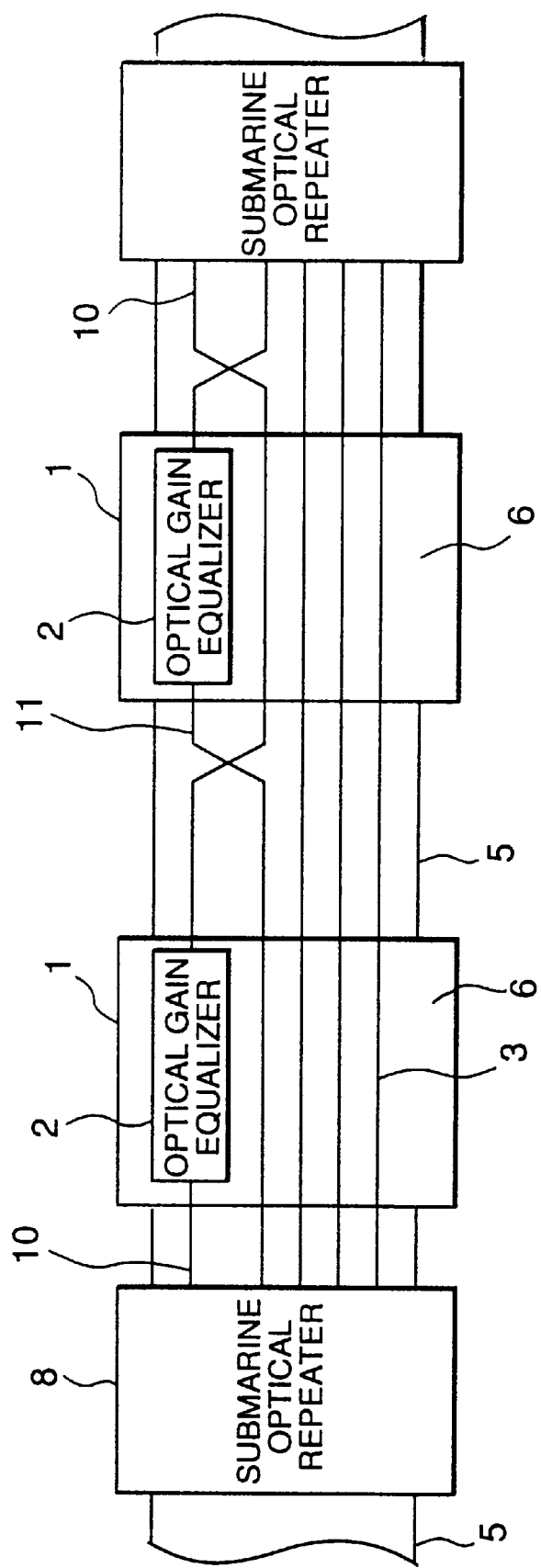
FIG. 3 is a diagram illustrating a configuration in which two submarine optical gain equalizers are installed on a submarine optical transmission line.
Figure 4A:
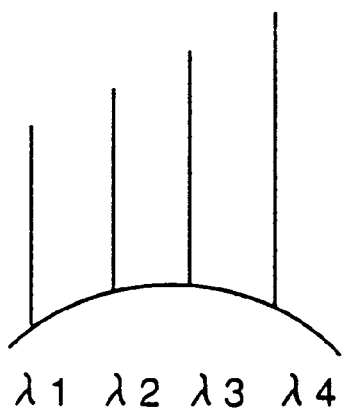
FIGS. 4A and 4B are diagrams illustrating levels of multi-wavelength optical signals before compensation.
Figure 4B:
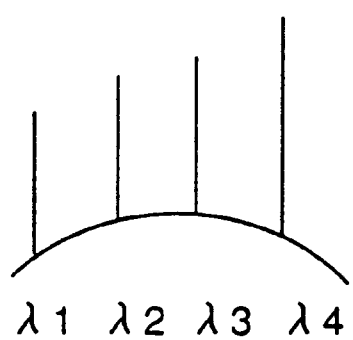
Figure 4C:
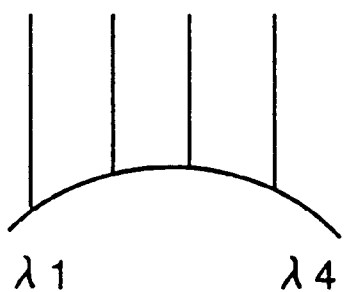
FIGS. 4C and 4D are those illustrating levels of multi-wavelength optical signals after compensation.
Figure 4D:
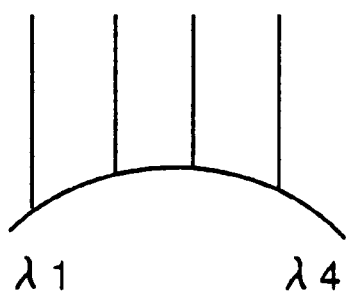

Referring to FIG. 3, there is shown a configuration including two submarine optical Equalizers 6 having attenuation characteristics different from each other on the submarine optical cable 5. In the submarine optical repeaters 8 shown in FIG. 3, an optical fiber amplifier and other devices are installed. If characteristics of each level difference of multi-wavelength optical signals in a fiber 10 in FIG. 3 are as shown in FIG. 4A and characteristics of each level difference of multi-wavelength optical signals in a fiber 11 in FIG. 3 are as shown in FIG. 4B, it is necessary to install submarine optical gain equalizers having attenuation characteristics which meet the characteristics of the level differences of the multi-wavelength optical signals for these two fibers. Under these conditions, the optical signals transmitted through the submarine optical gain equalizers have such characteristics that the multi-wavelength signal light has the same level in both of the fibers as shown in FIGS. 4C and 4D.

The submarine optical gain equalizer 6 of the present invention is connected to optical fibers in the submarine cable 5 when the level difference between the shortest wavelength and the longest one of the multi-wavelength signal light becomes 2 dB to 3 dB. In a long-distance submarine optical transmission line, light amplifiers are generally installed at intervals of approx. 40 to 50 km. Giving an example of 8-wavelength light having intervals of 0.8 nm and assuming a temperature error 2° C. and an input level error of an optical signal into each light amplifier 0.5 dB, a level difference 2 dB between the shortest wavelength and the longest one arises when the optical signal has passed through 40 light amplifiers. Therefore, it is preferable to install the above submarine optical gain equalizers at intervals of approx. 1,600 km on the submarine cable 5.

An installation method of the submarine optical gain equalizers 6 on the submarine cable 5 will be described below. First, based on the conditions such as the characteristics of the light amplifiers and the sea temperature in the submarine cable installation sea area as mentioned above, submarine optical gain equalizers having fixed attenuation characteristics of certain attenuation amounts for respective wavelengths, while also preparing submarine optical gain equalizers are prepared having attenuation characteristics values of respective wavelengths slightly different from those of the above submarine optical gain equalizers. Then, multi-wavelength light having the same wavelength as for actual signal light is practically transmitted to each optical fiber from an end office. At this point, it is checked that a level difference between the wavelengths becomes practically a predetermined value in a spot on the sea away from the end office by an estimated distance, and then a submarine optical gain equalizer 6 is connected, this equalizer having been previously designed so as to be adapted to the level difference. If the level difference of the multi-wavelength light differs from the estimated one, a submarine optical gain equalizer having other attenuation characteristics is used, this equalizer also having been prepared in advance instead of the above submarine optical gain equalizer for the connection. In this manner, an optimum submarine optical gain equalizer 6 is installed for respective fibers.

The multi-wavelength optical signal used in the above embodiment has a 1.55µ bandwidth with each wavelength having 0.8 nm to 1.0 nm intervals.

As set forth hereinabove, the present invention provides an optimum submarine optical gain equalizer for each optical fiber installed in a required position so as to compensate efficiently and easily at low cost for level differences between wavelengths caused by characteristics of light amplifiers or other conditions.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A submarine optical gain equalizer applied to a submarine optical transmission line, comprising:

a pressure housing, an optical gain equalizer installed in the pressure housing, input and output ports of the optical gain equalizer being formed in the outside of said pressure housing, and one or more through fibers are installed in said pressure housing, input and output ports of the through fibers being formed in the outside of said pressure housing.

2. A submarine optical gain equalizer according to claim 1, wherein only one optical gain equalizer is installed in said pressure housing.

3. A submarine optical gain equalizer according to claim 1, wherein said optical gain equalizer is configured so as to attenuate levels of optical signals having specific wavelengths by predetermined amounts.

4. A submarine optical gain equalizer according to claim 1, wherein said optical gain equalizer has characteristics of attenuating levels of optical signals having wavelengths other than a shortest one so as to be equalized to a level of an optical signal having the shortest wavelength among optical signals of a plurality of wavelengths transmitted through said optical gain amplifier.

5. A submarine optical transmission line comprising:

a plurality of optical fibers composing the submarine optical transmission line, and one or more submarine optical gain equalizers installed on the submarine optical transmission line, said gain equalizers each comprising:

a pressure housing, an optical gain equalizer installed in the pressure housing, input and output ports of the optical gain equalizer being formed in the outside of said pressure housing, and one or more through fibers are installed in said pressure housing, input and output ports of the through fibers being formed in the outside of said pressure housing.

6. A submarine optical transmission line according to claim 5, wherein said submarine optical gain equalizers have optical attenuation characteristics different from each other.

* * * * *